(No Model.) 2 Sheets—Sheet 1.
O. S. WALKER.
COUNTERSHAFT.
No. 543,913. Patented Aug. 6, 1895.
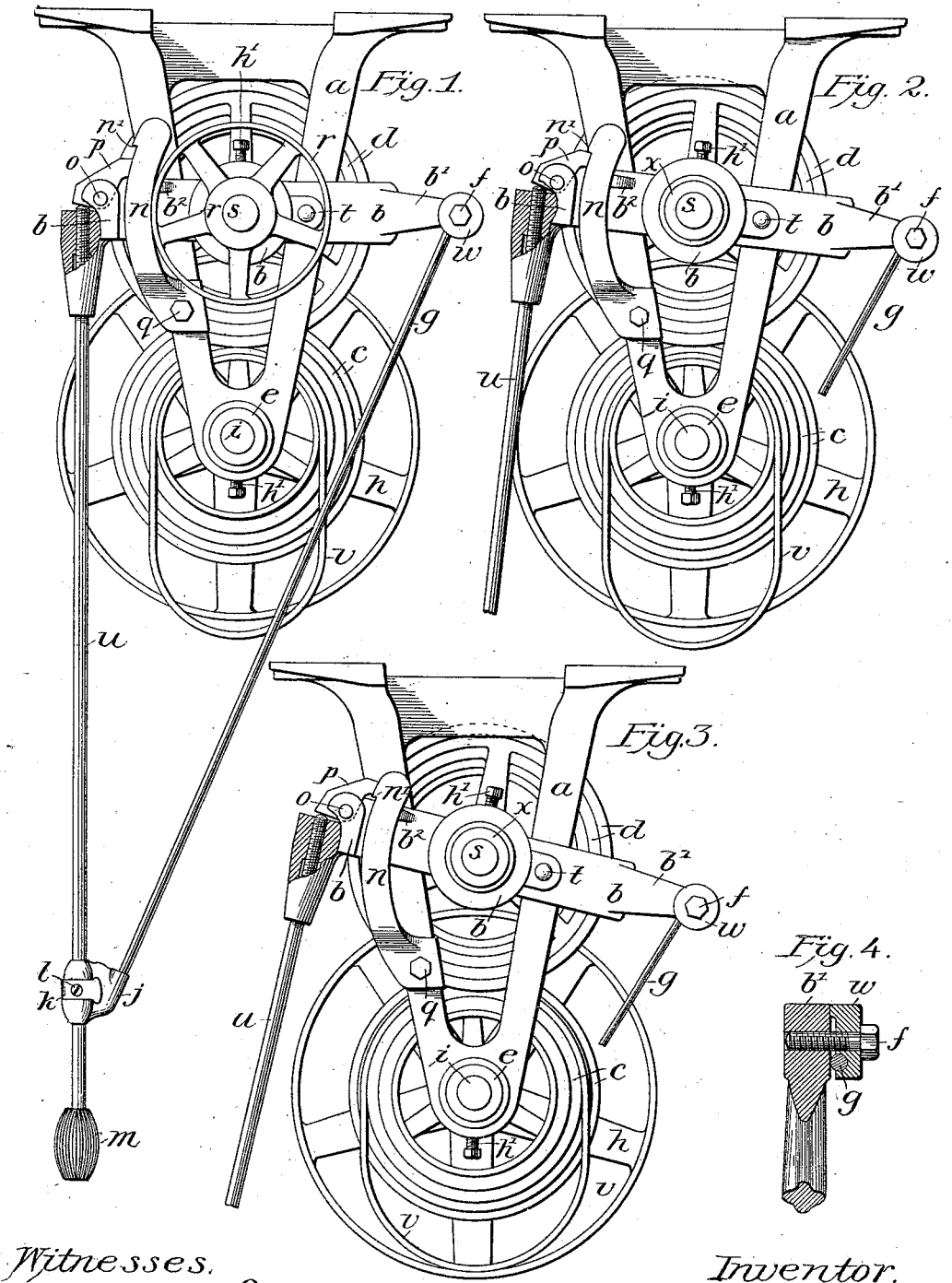
Witnesses.
Rufus B. Fowler
H. M. Fowler
Inventor.
Oakley S. Walker (No Model.)  2 Sheets—Sheet 2.
O. S. WALKER.
COUNTERSHAFT.
No. 543,913. Patented Aug. 6, 1895.
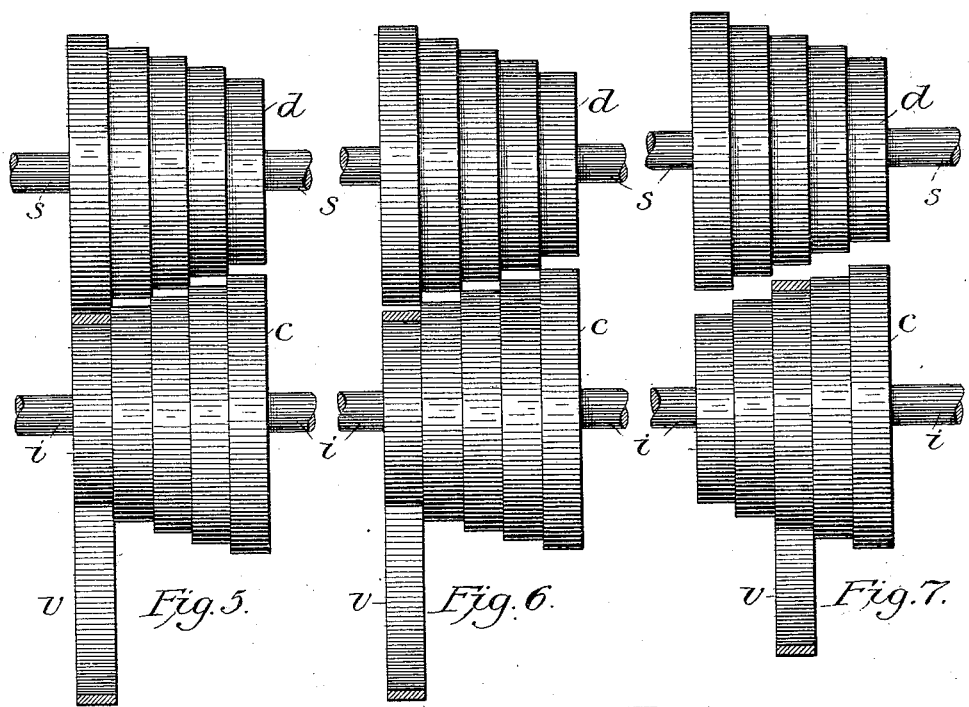
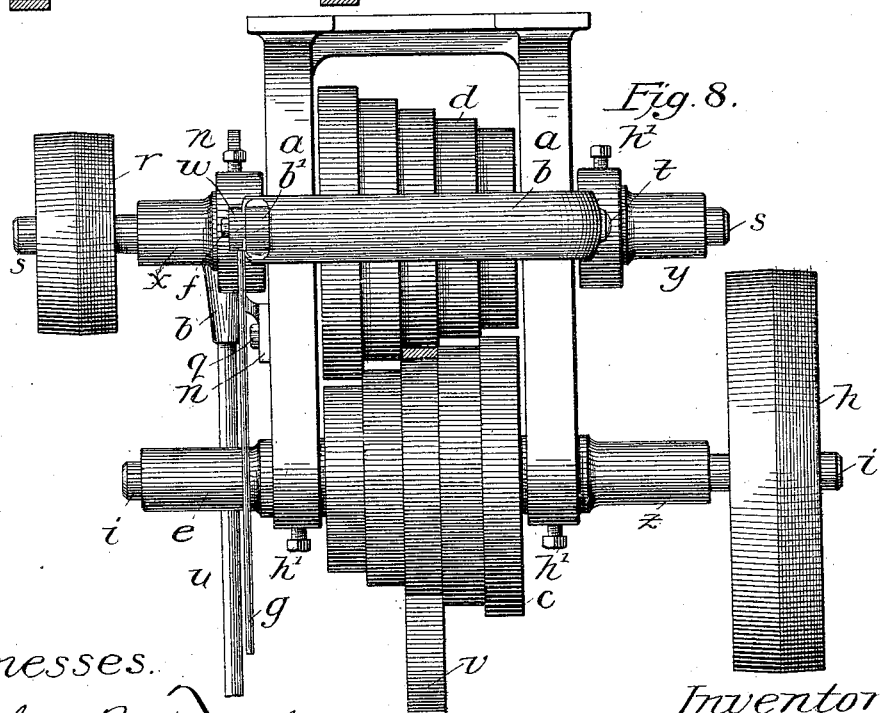
Witnesses.
Rufus B. Fowler
H. M. Fowler
Inventor:
Oakley S. Walker

UNITED STATES PATENT OFFICE.

OAKLEY S. WALKER, OF WORCESTER, MASSACHUSETTS.

COUNTER-SHAFT.

SPECIFICATION forming part of Letters Patent No. 543,913, dated August 6, 1895.

Application filed September 16, 1892. Serial No. 446,124. (No model.)

*To all whom it may concern:*

Be it known that I, OAKLEY S. WALKER, residing at Worcester, in the county of Worcester and State of Massachusetts, have invented certain new and useful Improvements in Counter-Shafts, of which the following is a specification, reference being had to the accompanying drawings, forming a part of the same, in which—

Figure 1 represents an end elevation of my improved counter-shaft, showing the stepped pulleys $c$ and $d$ in contact with an interposed frictional driving-belt. Fig. 2 represents the same view as shown in Fig. 1, but with the pulley $r$ and portions of the shipping-rods $u$ and $g$ removed. It also represents the stepped pulleys as slightly separated, so as to bring the upper pulley out of contact with the driving-belt. Fig. 3 represents a similar view as shown in Fig. 2, but with the stepped pulleys separated farther apart in order to allow the frictional belt to be shifted from one step to another. Fig. 4 is a sectional view of a portion of the arm $b'$, and showing the method of attaching the rod $g$ to the arm $b'$. Figs. 5, 6, and 7 are detached views of the stepped pulleys $c$ and $d$, with a portion of the frictional driving-belt $v$, Fig. 5 representing the pulleys in operative contact with the belt, Fig. 6 representing the pulleys slightly separated, so as to release the belt from contact with the upper pulley, and Fig. 7 shows the pulleys still farther separated, in order to allow the driving-belt $v$ to be moved from one step to another; and Fig. 8 is a side elevation representing the right-hand side, as shown in Figs. 1, 2, and 3, with the belt carried upon the second step of the pulley $c$.

Similar letters refer to similar parts in the different figures.

The object of my present invention is to provide a counter-shaft operated by the so-called "frictional gearing," and having means by which the speed of the driven shaft can be varied; and it consists in the organization and construction of the several parts as hereinafter described, and pointed out in the annexed claims.

Referring to the accompanying drawings, $a$ denotes a hanger or framework by which the operating parts of the device are supported, the hanger being attached in the usual manner to the ceiling by suitable bolts.

$b$ denotes a horizontal frame pivoted at $t$ to the hanger $a$, so as to be capable of an oscillating motion.

$c$ denotes a stepped pulley attached to a shaft $i$ journaled in boxes $e$ and $z$, supported by the hanger $a$, and $d$ a stepped pulley attached to a shaft $s$ journaled in bearings $x$ and $y$, supported by the pivoted frame $b$.

Mounted upon the shaft $s$ is a pulley $r$, to which a rotary motion can be applied through a belt connection with the main line of shafting, and to the shaft $i$ is mounted a pulley $h$, from which a belt connection can be made with the machine to be driven.

Upon one of the steps of the stepped pulley $c$, I place an endless belt $v$, so that when the corresponding step of the rotating stepped pulley $d$ is brought into contact with the driving-belt $v$ rotary motion will be imparted to the stepped pulley $c$, shaft $i$, and pulley $h$ in the manner common in the so-called "frictional gearing," the speed of the shaft $i$, of course, varying relatively to the uniform motion of the shaft $s$ as the driving-belt $v$ is changed from one step to another upon the pulley $c$, and the rotary motion of the shaft $i$ can be checked by lifting the pulley $d$ out of contact with the driving-belt $v$ by the oscillation of the frame $b$.

The difference between the diameter of each step of the pulleys $c$ and $d$ and the diameter of the next adjacent step is slightly more than twice the thickness of the driving-belt $v$, so that the stepped pulley $d$ can be raised far enough to carry it out of frictional contact with the driving-belt $v$ and still have the steps of the pulley $d$ slightly overlap the steps of the pulley $c$, as represented in Fig. 6, thereby checking the rotation of the pulley $c$ and at the same time restraining the driving-belt $v$ from moving laterally and sliding from a larger to a smaller step on the pulley $c$, and also preventing the belt from being caught between the corners of the steps.

I prefer to make the difference in the diameters of adjacent steps slightly more than twice the thickness of the belt, so that the shoulder formed by a step of the pulley $d$ shall slightly overlap the opposite step upon the pulley $c$ when the pulley $d$ has been raised out of frictional contact with the driving-belt $v$, as shown in Fig. 6; but it is obvious that the shoulder formed by a step of the pulley might be equal to, or in case a thick belt were used even less than the thickness of the belt; it being sufficient, especially when a thick belt is used, that the shoulder formed by the step overlap the edge of the belt only when the pulley $d$ is raised out of contact with the belt. Therefore, I do not limit myself to any specific proportions in the diameters of the steps, it only being necessary that the notch $n'$ shall be so arranged at the proper height to allow the pulley $d$ to be carried out of frictional contact with the driving-belt, and that the shoulders formed by the steps of the pulleys shall be deep enough to sufficiently overlap the edge of the belt to prevent its lateral movement and its becoming caught between the corners of the steps. Whenever it is desired to shift the belt from one step to another on the pulley $c$, the pulley $d$ is raised far enough to afford sufficient space to allow the belt to be moved from one step to another, as represented in Fig. 7.

The oscillation of the frame $b$, by which the stepped pulley $d$ is raised or lowered, is accomplished by the attendant by means of the shipping-rods $u$ and $g$. The shipping-rod $u$ has a screw-threaded connection at its upper end with one end of the frame $b$, and the lower end of the rod $u$ is provided with a handle $m$, by which the rod may be rotated in the frame $b$, or the frame $b$ may be raised or lowered by a swinging motion of the rod $u$. When the pulley $d$ has been raised or lowered into a desired position, the frame $b$ is locked in place by means of a plate $n$ curved concentrically with the axis of the frame $b$, and pivotally attached at one end by a screw $q$ to the hanger $a$.

The curved plate $n$ extends by the side of the frame $b$ and between a projecting lug $b^2$ formed on the frame $b$ and a bent lever $p$ pivoted on a pin $o$ held in the frame $b$. One end of the bent lever $p$ rests against one edge of the curved plate $n$, and the opposite end of the bent lever $p$ rests upon the upper screw-threaded end of the shipping-rod $u$. By rotating the shipping-rod $u$ and advancing the same upward against one end of the bent lever $p$ the opposite end of the lever $p$ will be crowded against the edge of the curved plate $n$, causing the curved plate $n$ to be firmly gripped between the fixed lug $b^2$ and the lever $p$, thereby holding the frame $b$ from movement about the pivots $t$. By slightly unscrewing the rod $u$ the curved plate $n$ will be relieved from the pressure of the lever $p$, allowing the frame $b$ to be moved on the pivots $t$ by the swinging motion of the shipping-rod $u$. From the opposite end of the frame $b$ an arm $b'$ projects, the end of which is connected with the rod $u$ by a shipping-rod $g$, which serves as a brace-rod, in order to stiffen the rod $u$ and allow the frame $b$ to be oscillated by power applied at opposite ends.

The brace-rod $g$ is connected with the arm $b'$ by means of a bolt $f$ and a washer $w$, which incloses the upper end of the rod $g$ and holds the same firmly against the side of the arm $b'$.

The lower end of the rod $g$ is attached to a forked bracket $j$, which incloses the rod $u$ and is held from longitudinal movement thereon by a collar $k$, included within the arms of the bracket $j$ and attached to the rod $u$ by a set-screw L. As the washer $w$ is capable of being rotated around the bolt $f$ and the forked bracket $j$ is loose upon the rod $u$, except as it is adjustably held from longitudinal movement by the collar $k$, I am enabled to vary the length of the brace-rod $g$ and adjust the shipping-rods to ceilings of different heights. In order to disconnect the pulleys by lifting the pulley $d$ out of frictional contact with the driving-belt $v$ and at the same time prevent the overlapping edges of the steps from being separated, I provide the curved plate $n$ with a notch $n'$ placed at the proper position on the plate to be struck by the end of the bent lever $p$ when the frame $b$ has been raised far enough to bring the pulley $d$ into the position represented in Fig. 6, or out of contact with the driving-belt $v$, and with its steps overlapping the steps of the pulley $c$, so that in operatively connecting and disconnecting the pulleys $d$ and $c$ the upward angular movement of the frame $b$ is limited by the notch $n'$. When it is desired to shift the belt $v$ from one step to another of the pulleys the shipping-rod $u$ is farther unscrewed, and as the lower arm of the lever $p$ is the heavier its weight will rock the lever $p$ on the pin $o$, causing it to clear the notch $n'$ and permit the frame $b$ to be raised, as represented in Fig. 3, separating the pulleys, as shown in Fig. 7. While it is necessary to unscrew the shipping-rod $u$ far enough to allow the bent lever $p$ to clear the notch $n'$ in order to separate the pulleys far enough to shift the belt, a partial rotation of the shipping-rod $u$ is only required to release the locking mechanism so the pulley $d$ can be moved from the position shown in Fig. 5 to that shown in Fig. 6 and vice versa.

I am aware that counter-shafts have been constructed designed to drive machines at different velocities by means of a frictional driving-belt gripped between a pair of cone-pulleys and having shipping mechanism by which the belt is moved along the surface of the cone-pulleys and also held from movement in any desired position. While this construction is especially adapted to those uses in which a frequent and minute variation in the velocity is required, it possesses the obvious disadvantage that different points in the periphery of the contact with the belt moved at different velocities, rendering it unavoidable that the belt should slip throughout some portion of its area of contact with the driving-pulley.

In my improved counter-shaft I employ stepped pulleys instead of the cone-pulleys commonly used in frictional gearing, and I make the edges of the steps form confining walls to prevent the lateral movement of the belt from one step to a smaller, and I provide an improved shipping mechanism provided with a stop to limit the angular movement of the pulley-carrying frame $b$, which at the same time readily allows the pulleys to be separated for the purpose of shifting the belt from one step to another.

What I claim as my invention, and desire to secure by Letters Patent, is—

1. The combination of a fixed frame, a shaft journaled in said fixed frame and a stepped pulley carried on said shaft, a pivoted frame, a shaft journaled in said pivoted frame, a stepped pulley carried on said shaft, an endless belt interposed between said stepped pulleys and a stop by which the angular motion of said pivoted frame is limited with relation to the shoulders of the steps of said pulleys, whereby said endless belt is restrained by said shoulders when the pulleys are operatively disconnected, substantially as described.

2. The combination of a fixed frame, a stepped pulley supported by said fixed frame, a pivoted frame, a stepped pulley supported by said pivoted frame, said pulleys having parallel axes, an endless belt interposed between said pulleys and a shipping rod connected with said pivoted frame, by which the pulley supported in said frame is carried toward, or away from, the other, substantially as described.

3. The combination of a hanger, a shaft journaled in said hanger, a stepped pulley carried on said shaft, a pivoted frame $b$, a shaft journaled in said frame, a stepped pulley carried on said shaft, a belt between said pulleys, a plate $n$ attached to said hanger and curved concentric with the pivot of said pivoted frame, a pivoted lever carried by said pivoted frame and arranged to engage said curved plate, and means for actuating said pivoted lever, substantially as described.

4. The combination of hanger $a$, a stepped pulley $c$ supported by said hanger, a pivoted frame $b$, a stepped pulley supported by said pivoted frame, a belt between said pulleys, a stop $b$ on said frame, a pivoted lever $p$ carried by said frame, a curved plate $n$ attached to said hanger concentrically with the axis of said pivoted frame and said plate being placed between said stop and said pivoted lever and means for rocking said lever and gripping said curved plate, substantially as described.

5. The combination of hanger $a$, pivoted frame $b$, pulleys supported by said hanger and frame, an endless belt between said pulleys, a curved plate $n$ attached to said hanger and concentrically with the axis of said pivoted frame, a pivoted lever $p$ carried by said frame and arranged to bear against said curved plate, and a screw threaded rod held in said frame and bearing against said lever to press it against said curved plate, substantially as described.

6. The combination of the hanger $a$, pivoted frame $b'$, stepped pulleys supported by said hanger and frame, a belt between said pulleys, rod $u$ connected with one end of said pivoted frame, and a brace rod $g$ connecting said rod $u$ with the opposite end of said pivoted frame and a locking mechanism by which said pivoted frame is held from movement, substantially as described.

OAKLEY S. WALKER.

Witnesses:
CHAS. L. ALLEN,
D. C. LAKIN.